US012036457B2

(12) United States Patent
Lee et al.

(10) Patent No.: US 12,036,457 B2
(45) Date of Patent: Jul. 16, 2024

(54) HOLE LOCATION UPDATING DEVICE AND METHOD FOR OPERATING HOLE LOCATION UPDATING DEVICE

(71) Applicant: VC INC., Seoul (KR)

(72) Inventors: Hakyong Lee, Yongin-si (KR); Hee Joon Park, Gwangju-si (KR); Yongwoo Lee, Seongnam-si (KR); Juno Kim, Seongnam-si (KR)

(73) Assignee: VC INC., Seoul (KR)

( * ) Notice: Subject to any disclaimer, the term of this patent is extended or adjusted under 35 U.S.C. 154(b) by 248 days.

(21) Appl. No.: 17/635,824

(22) PCT Filed: Jul. 21, 2020

(86) PCT No.: PCT/KR2020/009582
§ 371 (c)(1),
(2) Date: Feb. 16, 2022

(87) PCT Pub. No.: WO2021/033926
PCT Pub. Date: Feb. 25, 2021

(65) Prior Publication Data
US 2022/0305358 A1   Sep. 29, 2022

(30) Foreign Application Priority Data

Aug. 20, 2019 (KR) .......................... 10-2019-0101835

(51) Int. Cl.
*A63B 57/00* (2015.01)
*A63B 57/40* (2015.01)

(52) U.S. Cl.
CPC ............ *A63B 57/505* (2015.10); *A63B 57/40* (2015.10); *A63B 2220/12* (2013.01); *A63B 2220/833* (2013.01); *A63B 2225/50* (2013.01)

(58) Field of Classification Search
CPC ............... A63B 57/505; A63B 57/40; A63B 2220/12; A63B 2220/833; A63B 2225/50
See application file for complete search history.

(56) References Cited

U.S. PATENT DOCUMENTS 10,956,740 B1 * 3/2021 Vanderdrift ............ G06V 20/20
2010/0160057 A1 * 6/2010 Willett ................. A63B 57/357
362/183

(Continued)

FOREIGN PATENT DOCUMENTS

JP   2016-066908   4/2016
JP   2016-163627   9/2016

(Continued)

OTHER PUBLICATIONS

KIPO, PCT Search Report & Written Opinion of PCT/KR2020/009582 dated Oct. 28, 2020.

*Primary Examiner* — Justin L Myhr
*Assistant Examiner* — Carl V Larsen
(74) *Attorney, Agent, or Firm* — LEX IP MEISTER, PLLC

(57) ABSTRACT

A hole location updating device and a method for operating a hole location updating device are provided. The hole location updating device having a housing including a flagpole combiner for providing a combination with a flagpole, includes: a global positioning system (GPS) circuit for detecting a GPS position of a hole; a mobile communication circuit for providing access to a server through a mobile communication network; and a control circuit operable in a power blocking mode, escaping from the power blocking mode in response to a wakeup signal to update a hole location, and entering the power blocking mode.

20 Claims, 9 Drawing Sheets

(56) References Cited

U.S. PATENT DOCUMENTS

| | | | | |
|---|---|---|---|---|
| 2013/0314906 | A1* | 11/2013 | Spinner | A63B 37/0003 |
| | | | | 362/145 |
| 2016/0205238 | A1* | 7/2016 | Abramson | H04W 4/029 |
| | | | | 455/456.4 |
| 2016/0330593 | A1* | 11/2016 | Caperell | H04W 4/021 |
| 2017/0023995 | A1* | 1/2017 | Liepold | G06F 1/3215 |
| 2017/0216703 | A1* | 8/2017 | Stephens | H04W 4/025 |
| 2018/0033311 | A1* | 2/2018 | Berggren | G01S 19/01 |
| 2018/0333629 | A1* | 11/2018 | Saitoh | G01C 21/20 |
| 2019/0255418 | A1* | 8/2019 | Seo | A63B 69/3605 |
| 2020/0117264 | A1* | 4/2020 | DeBates | H04W 52/0212 |
| 2020/0217955 | A1* | 7/2020 | DeCastro | G01S 19/19 |

FOREIGN PATENT DOCUMENTS

| | | |
|---|---|---|
| JP | 2018-191985 | 12/2018 |
| KR | 10-2008-0001235 | 1/2008 |
| KR | 10-0890252 | 3/2009 |
| KR | 10-1007854 | 1/2011 |
| KR | 10-2012-0036622 | 4/2012 |
| KR | 10-1848892 | 4/2018 |

* cited by examiner

HOLE LOCATION UPDATING DEVICE AND METHOD FOR OPERATING HOLE LOCATION UPDATING DEVICE

CROSS-REFERENCE TO RELATED APPLICATION

This application claims priority to and the benefit of Korean Patent Application No. 10-2019-0101835 filed in the Korean Intellectual Property Office on Aug. 20, 2019, the entire contents of which are incorporated herein by reference.

BACKGROUND OF THE DISCLOSURE

(a) Field of the Disclosure

The present disclosure relates to a hole location updating device and a method for operating a hole location updating device.

(b) Description of the Related Art

Golf represents sports in which a golf ball is struck into holes. A golfer considers a current position of the golf ball and a position of the hole to determine a target spot, and selects a suitable club and strikes the golf ball so that the golf ball may fly into the target spot.

To find the position of the hole and a distance to the hole from the current position, the golfer refers to distance-marking fixed facilities installed along a flagpole (or a pin) put in the hole and a fairway. However, as the position of the hole frequently changes, it may not be reflected to the fixed facilities. Hence, it is difficult for the golfer to accurately understand the distance to the hole from the current position.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide a hole location updating device for providing a changed position of a hole to a golfer, and a method for operating a hole location updating device.

An embodiment of the present disclosure provides a hole location updating device having a housing including a flagpole combiner for providing a combination with a flagpole, including: a global positioning system (GPS) circuit for detecting a GPS position of a hole; a mobile communication circuit for providing access to a server through a mobile communication network; and a control circuit operable in a power blocking mode, escaping from the power blocking mode in response to a wakeup signal to update a hole location, and entering the power blocking mode.

The control circuit may supply power to the GPS circuit and the mobile communication circuit in response to the wakeup signal, may receive GPS position data on the hole from the GPS circuit, and may transmit the GPS position data to the server by using the mobile communication circuit.

The control circuit may transmit the GPS position data to the server and may enter the power blocking mode.

The control circuit may supply power to the GPS circuit in response to the wakeup signal, may receive GPS position data on the hole from the GPS circuit, and may compare storage position data stored by the hole location updating device and the GPS position data, and when a hole location update is determined to be needed as a result of the comparison, the control circuit may supply power to the mobile communication circuit and may transmit the GPS position data to the server by using the mobile communication circuit.

The control circuit may transmit the GPS position data to the server and may enter the power blocking mode.

When the hole location update is determined to be unneeded as a result of the comparison, the control circuit may enter the power blocking mode.

The housing may further include at least one button, and the wakeup signal may be generated from a button input generated by the at least one button.

The hole location updating device may further include a sensor, and the wakeup signal may be generated from a sensor input generated by the sensor.

The sensor may include an acceleration sensor, and the sensor input may indicate an angle at which the flagpole stands.

The sensor may include an acceleration sensor, and the sensor input may represent a distance the hole location updating device moves.

The sensor may include a touch sensor, and the sensor input may be generated when a tap operation on the hole location updating device is detected.

The control circuit may further include a counter, and the wakeup signal may be generated when a value of the counter reaches a predetermined value.

The control circuit may supply power to the mobile communication circuit in response to the wakeup signal, and when receiving a position reporting instruction from the server by using the mobile communication circuit, the control circuit may receive GPS position data on a hole from the GPS circuit, and may transmit the GPS position data to the server by using the mobile communication circuit.

Another embodiment of the present disclosure provides a method for operating a hole location updating device having a housing including a flagpole combiner for providing a combination with a flagpole, including: operating in a power blocking mode; receiving a wakeup signal; escaping from the power blocking mode in response to the wakeup signal and updating the hole location; and entering the power blocking mode.

The updating of the hole location may include: supplying power to a GPS circuit and receiving GPS position data on the hole from the GPS circuit; and supplying power to a mobile communication circuit and transmitting the GPS position data to a server by using the mobile communication circuit.

The updating of the hole location may include: supplying power to a GPS circuit and receiving GPS position data on the hole from the GPS circuit; comparing storage position data stored by the hole location updating device and the GPS position data; and when a hole location update is determined to be needed as a result of the comparison, supplying power to a mobile communication circuit, and transmitting the GPS position data to the server by using the mobile communication circuit.

The updating of the hole location may further include, when a hole location update is determined to be unneeded as a result of the comparison, entering the power blocking mode.

The housing may further include at least one button, and the wakeup signal may be generated from a button input generated by the at least one button.

The hole location updating device may further include a sensor, and the wakeup signal may be generated from a sensor input generated by the sensor.

The hole location updating device may further include a counter, the wakeup signal may be generated when a value of the counter reaches a predetermined value, and the method for operating a hole location updating device may include supplying power to a mobile communication circuit in response to the wakeup signal, receiving a position reporting instruction from a server by using the mobile communication circuit, receiving GPS position data on a hole from a GPS circuit, and transmitting the GPS position data to the server by using the mobile communication circuit.

According to the present disclosure, the golfer may quickly receive the changed position of the hole, and the hole location updating device for providing the changed position of the hole to the golfer may minimize power consumption so the golfer may not frequently replace the batteries and may use the same for a long time.

DETAILED DESCRIPTION OF THE EMBODIMENTS

Figure 1:
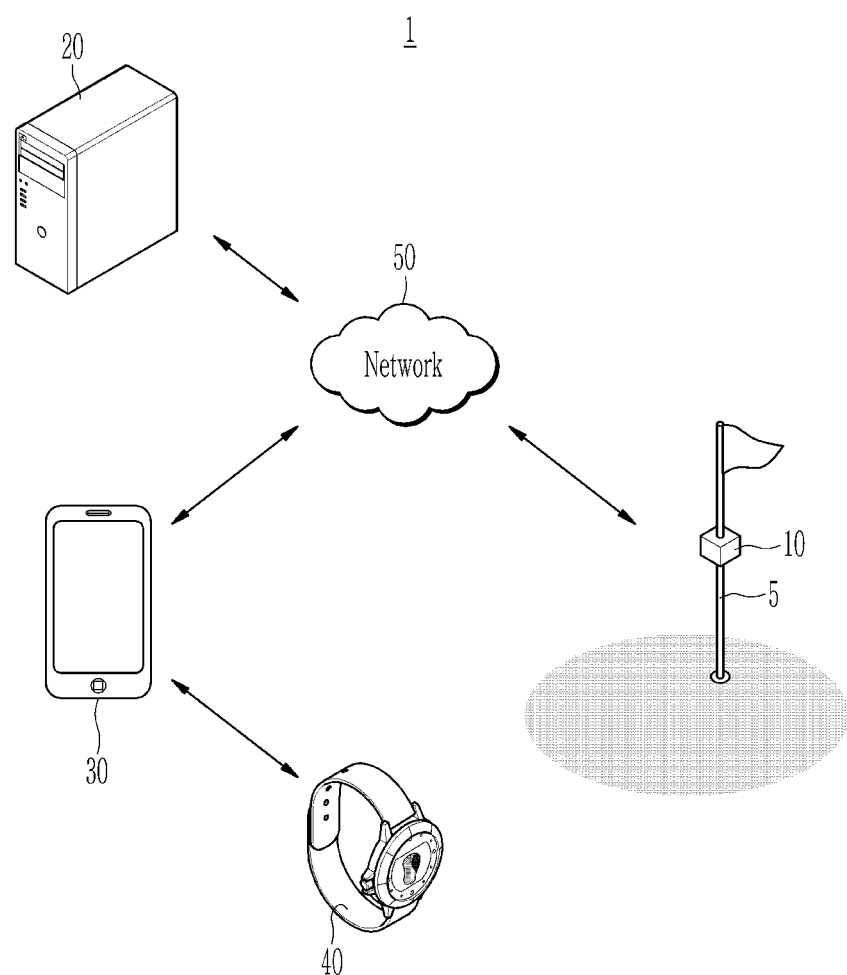
FIG. 1 shows a schematic diagram of a hole location updating system according to an embodiment of the present disclosure.

Embodiments disclosed in the present specification will be described in detail with reference to the accompanying drawings. In the present specification, the same or similar components will be denoted by the same or similar reference numerals, and an overlapped description thereof will be omitted. In describing embodiments of the present specification, when it is determined that a detailed description of the well-known art associated with the present disclosure may obscure the gist of the present disclosure, it will be omitted. The accompanying drawings are provided only in order to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

FIG. 1 shows a schematic diagram of a hole location updating system according to an embodiment of the present disclosure.

Referring to FIG. 1, the hole location updating system 1 according to an embodiment of the present disclosure may include a hole location updating device 10, a server 20, a mobile communication device 30, and a golf distance measuring device 40. However, a range of the present disclosure is not limited thereto, and the hole location updating system 1 may further include constituent elements or some of the constituent elements may be omitted in comparison to what are shown in FIG. 1.

The hole location updating device 10 may be realized to be combined to a flagpole 5 and may detect a position of the hole, further accurately, a position of the flagpole 5. The flagpole 5 is installed in a hole cup so when the position of the hole is changed, the position of the flagpole 5 is inevitably changed, and the hole location updating device 10 combined to the flagpole 5 may detect the change position of the hole. The hole location updating device 10 will be described in detail with reference to FIG. 2 and FIG. 3 in a later portion of the present specification.

The server 20 may be a computing device for providing a service to at least one of the hole location updating device 10, the mobile communication device 30, and the golf distance measuring device 40 through a network 50. That is, the server 20 may include arbitrary computing devices such as a personal computer for driving server software and providing a service to other devices or software, a blade server, or a main frame.

For example, the server 20 may provide a service for serving golf course related information in addition to golf course information, green position information, and hole location information to at least one of the hole location updating device 10, the mobile communication device 30, and the golf distance measuring device 40.

The mobile communication device 30 may be a terminal for accessing the server 20 through the network 50. The mobile communication device 30 may provide the golf course related information provided by the server 20 to a user. For example, the mobile communication device 30 may be a smartphone, a mobile phone, a tablet computer, and a laptop computer that are accessible to the mobile communication network, and the range of the present disclosure is not limited thereto.

The golf distance measuring device 40 may be a terminal that may be electrically accessible to the mobile communication device 30. The golf distance measuring device 40 may receive the golf course related information provided by the server 20 through the mobile communication device 30, and may provide the same to the user. Differing from what is shown in FIG. 1, the golf distance measuring device 40 may directly access the network 50. In this case, the golf distance measuring device 40 may directly receive the golf course related information provided by the server 20 and may provide the same to the user.

The golf distance measuring device 40 may be a wearable device, for example, a smart watch or a smart band, and the range of the present disclosure is not limited thereto.

The network 50 may include a mobile communication network including a cellular network, and a wireless network including a WiFi network and a Bluetooth network, and the range of the present disclosure is not limited thereto, and may include a wire network including a local area network (LAN) and a wide area network (WAN).

The hole location updating device 10 attached to the flagpole 5 put into the hole cup measures the current hole location and transmits the measured hole location to the server 20 through the network 50, for example, a mobile communication network. The server 20 may transmit the newest hole location to the mobile communication device 30 through the network 50, and the mobile communication device 30 may, for example, provide the newest hole location to the golf distance measuring device 40 through an application performed by a smartphone.

Figure 2:
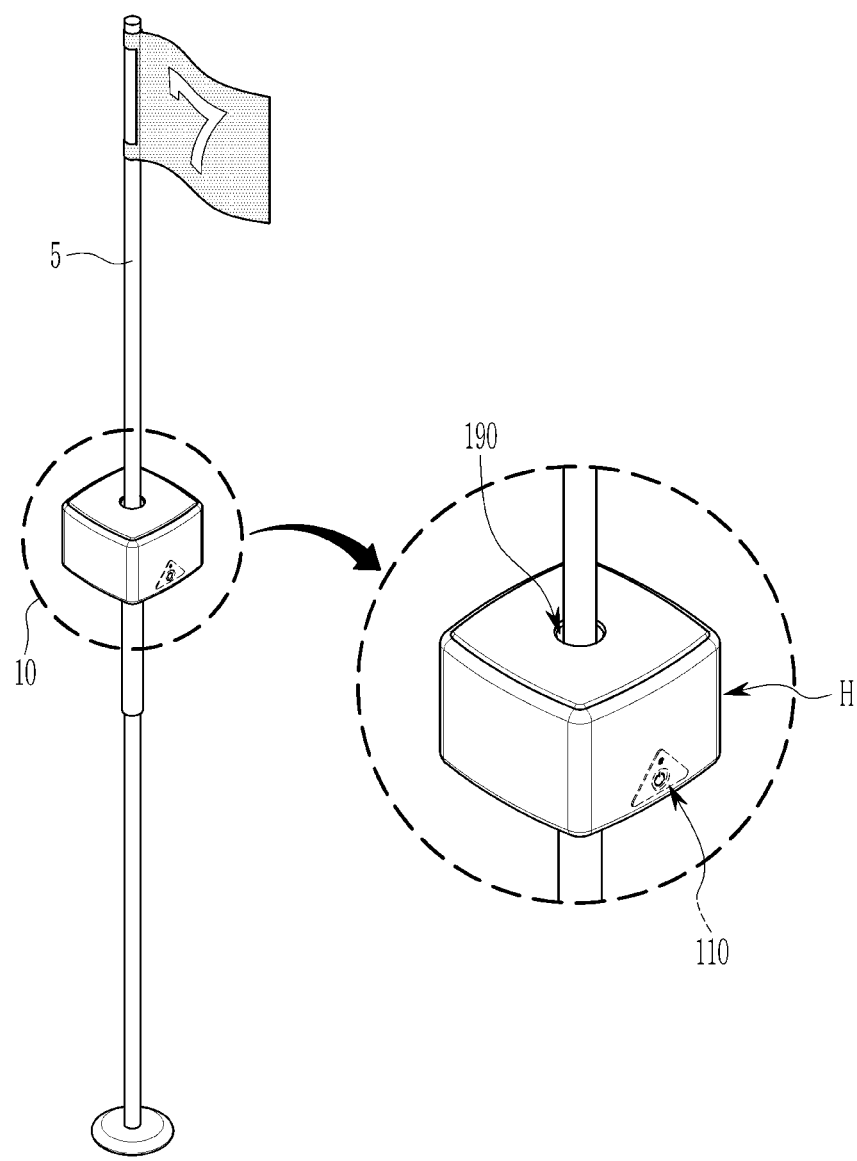
FIG. 2 shows a schematic diagram of a hole location updating device according to an embodiment of the present disclosure.

FIG. 2 shows a schematic diagram of a hole location updating device according to an embodiment of the present disclosure.

The golfer needs to accurately know a remaining distance to the hole from the position of the golfer. However, the position of the hole may be frequently changed to, for example, manage a green of the golf course and adjust a level of difficulty of the golf course. For ease of description, a method for providing a distance to a center of the green to the golfer, or a method for providing a distance to a designated spot to the golfer when the golfer designates the position of the hole may, precisely speaking, fail to provide the accurate position of the hole to the golfer.

To solve this problem, that is, to provide the accurate position of the hole to the golfer, a method for realizing a device for detecting positions in the hole or near the hole may be considered. That is, as shown in FIG. 2, as the flagpole 5 is installed in the hole cup, the hole location updating device 10 for detecting the hole location combined to the flagpole 5 may be considered.

However, as the hole is positioned in the green in the golf course, there is an environmental restriction that it is difficult to constantly supply power. When the power is supplied by a battery in the environmental restriction condition, and the battery is frequently replaced from the device positioned in the hole or near the hole, its practicality is reduced.

To additionally solve the drawback, a method for minimizing power consumption of the hole location updating device 10 is also needed.

Referring to FIG. 2, the hole location updating device 10 may be realized to be combined to the flagpole 5.

The hole location updating device 10 has a housing (H), and the housing (H) may include at least one button 110 and a flagpole combiner 190. A battery 160 for supplying power to the hole location updating device 10 may be included in the housing (H).

As shown in FIG. 2, at least one button 110 may be disposed at a lower portion of the housing (H) so that a manager (e.g., a greenkeeper) may press the button 110. The position of the at least one button 110 is not limited thereto, and the button 110 may be disposed on arbitrary spots of the housing (H) depending on detailed realization purposes.

When the manager puts the flagpole 5 into the changed hole and presses at least one button 110, the hole location updating device 10 in a power blocking mode may enter a wakeup mode to measure the current hole location and may transmit the measured hole location to the server 20 through the network 50. After transmitting the measured hole location to the server 20, the hole location updating device 10 may enter the power blocking mode again.

The "power blocking mode" signifies that supplying of power to the most constituent elements of the hole location updating device 10 is blocked. In other words, when the hole location updating device 10 enters the power blocking mode, supplying of power to all constituent elements excluding a circuit (a wakeup signal detecting circuit) that must be operated at all times to detect a "wakeup signal" must be blocked.

The "wakeup signal" signifies a signal for extricating the hole location updating device 10 having entered the power blocking mode from the power blocking mode. In some embodiments of the present disclosure, the wakeup signal may be a signal generated from the button input generated by at least one button 110, but the range of the present disclosure is not limited thereto, and other examples of the wakeup signal will be described in a later portion of the present specification.

The "wakeup mode" signifies an operation mode by which the hole location updating device 10 escapes from the power blocking mode. In the wakeup mode, there is no need to guarantee the supplying of power to all constituent elements of the hole location updating device 10, and if necessary, the power may be supplied to some constituent elements and may not be supplied to some other constituent elements.

While maintaining the power blocking mode as a default, only when the hole location is changed and the manager presses at least one button 110, by escaping from the power blocking mode, updating the current hole location, and entering the power blocking mode, the hole location updating device 10 installed in the green in the golf course where it is difficult to supply power all the time may be stably operated without replacing the battery for several months.

The flagpole combiner 190 provides a combination of the hole location updating device 10 and the flagpole 5. In general, the flagpole 5 may become thicker going downward, and the flagpole combiner 190 may have a structure for the hole location updating device 10 to be firmly fixed to the flagpole 5 of which the thickness changes. For example, the flagpole combiner 190 may be formed to have a cylindrical shape that becomes gradually wider going downward, or it may include additional parts for pressing the flagpole 5 in a right to left direction and fixing the same, and it may also be realized in various ways.

The battery 160 may be manufactured to have a shape that corresponds to an exterior of the housing (H), and the range of the present disclosure is not limited thereto.

Figure 3:
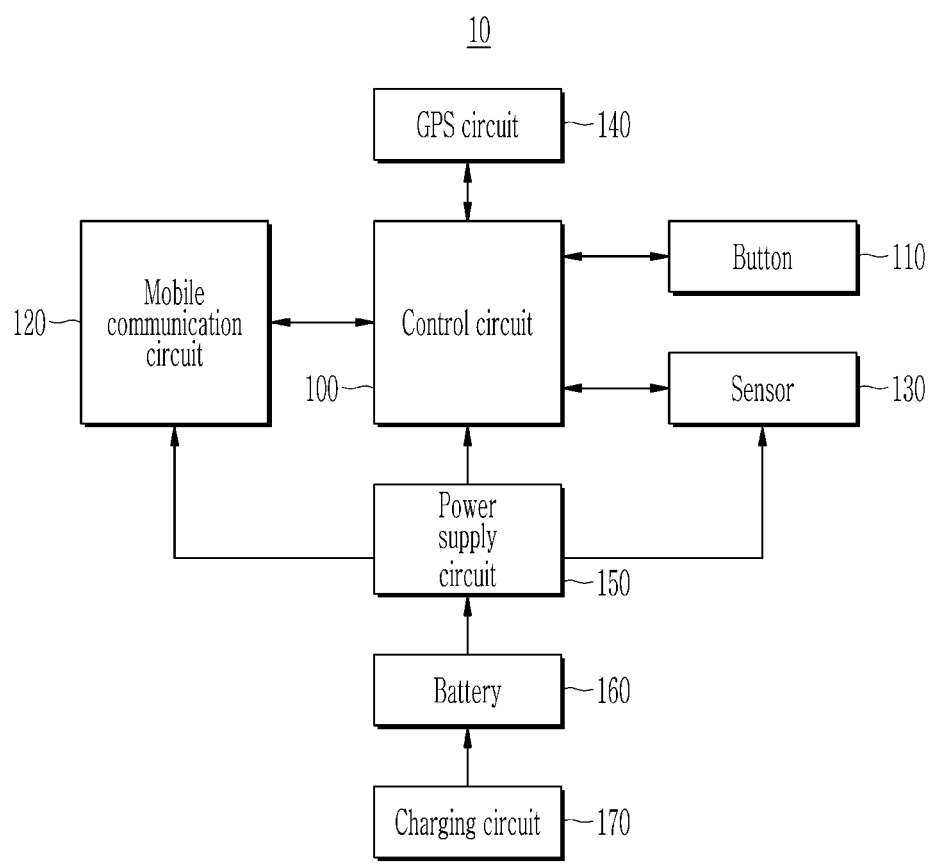
FIG. 3 shows a block diagram of a hole location updating device according to an embodiment of the present disclosure.

FIG. 3 shows a block diagram of a hole location updating device according to an embodiment of the present disclosure.

Referring to FIG. 3, the hole location updating device 10 according to an embodiment of the present disclosure may include a control circuit 100, a button 110, a mobile communication circuit 120, a sensor 130, a global positioning system (GPS) circuit 140, a power supply circuit 150, and a battery 160. Depending on whether the battery 160 is charged or not, the hole location updating device 10 may further include a charging circuit 170.

The control circuit 100 controls a general operation of the hole location updating device 10. The control circuit 100 may be realized with a processing circuit such as a microprocessor, a central processing unit (CPU), or an application processor (AP), and the range of the present disclosure is not limited thereto. The control circuit 100 may execute software or a program for realizing functions of the hole location updating device 10.

Particularly, the control circuit 100 may supply or block power to at least one of the control circuit 100, the mobile communication circuit 120, the sensor 130, and the GPS circuit 140 by controlling the power supply circuit 150. The control circuit 100 may include a wakeup signal detecting circuit that must be operable at all times to detect a wakeup signal, and when operated in the power blocking mode, it may block the supplying of power to the control circuit 100, the mobile communication circuit 120, the sensor 130, and the GPS circuit 140 excluding the wakeup signal detecting circuit.

The mobile communication circuit 120 may provide the access with the server 20 through the network 50, for example, a mobile communication network. In detail, when the control circuit 100 controls the power supply circuit 150 to supply power to the mobile communication circuit 120, the mobile communication circuit 120 provides the access with the server 20 through the network 50, and when the control circuit 100 controls the power supply circuit 150 to block the supplying of power to the mobile communication circuit 120, the mobile communication circuit 120 may be turned off.

The sensor 130 may provide various types of situation information on the flagpole 5 or environments around the flagpole 5. The sensor 130 may, for example, be at least one sensor such as an acceleration sensor or a touch sensor. Here, the acceleration sensor may be used to measure a moving distance of the flagpole 5 and an angle by which the flagpole 5 is input, and the touch sensor may, for example, be used to detect a tap operation.

When the control circuit 100 controls the power supply circuit 150 to supply power to the sensor 130 in a like way of the case of the mobile communication circuit 120, the sensor 130 may detect the situation information on the flagpole 5 or environments around the flagpole 5, and when the control circuit 100 controls the power supply circuit 150 to block the supplying of power to the sensor 130, the mobile communication circuit 120 may be turned off.

The GPS circuit 140 may detect a GPS position on the hole. The GPS circuit 140 may include a GPS communication chip for communicating with a satellite and receiving coordinates of the GPS position.

In a like way of the case of the mobile communication circuit 120, when the control circuit 100 controls the power supply circuit 150 to supply power to the GPS circuit 140, the GPS circuit 140 may detect the GPS position of the hole, and when the control circuit 100 controls the power supply circuit 150 to block the supplying of power to the GPS circuit 140, the mobile communication circuit 120 may be turned off.

The power supply circuit 150 may supply power to the control circuit 100, the mobile communication circuit 120, the sensor 130, and the GPS circuit 130 under the control by the control circuit 100. The power supply circuit 150 may receive power from the battery 160.

In some embodiments of the present disclosure, the hole location updating device 10 may further include a charging circuit 170. For example, when the battery 160 of the hole location updating device 10 is realized to be chargeable, for example, a rechargeable battery, the charging circuit 170 may charge the battery 160.

In some embodiments of the present disclosure, when the battery 160 of the hole location updating device 10 is realized with a battery that is not charged, for example, a primary battery, the hole location updating device 10 may omit the charging circuit 170.

The control circuit 100 is operated in the power blocking mode as a default, and it may escape from the power blocking mode in response to the wakeup signal, may update the hole location, and may enter the power blocking mode. The escaping of the control circuit 100 from the power blocking mode in response to the wakeup signal and updating the hole location may include: the control circuit 100 supplying power to the GPS circuit 140 and the mobile communication circuit 120 in response to the wakeup signal; receiving GPS position data on the hole from the GPS circuit 140; and transmitting the GPS position data to the server 20 by using the mobile communication circuit 120. The control circuit 100 may enter the power blocking mode after transmitting the GPS position data to the server 20.

Figure 4:
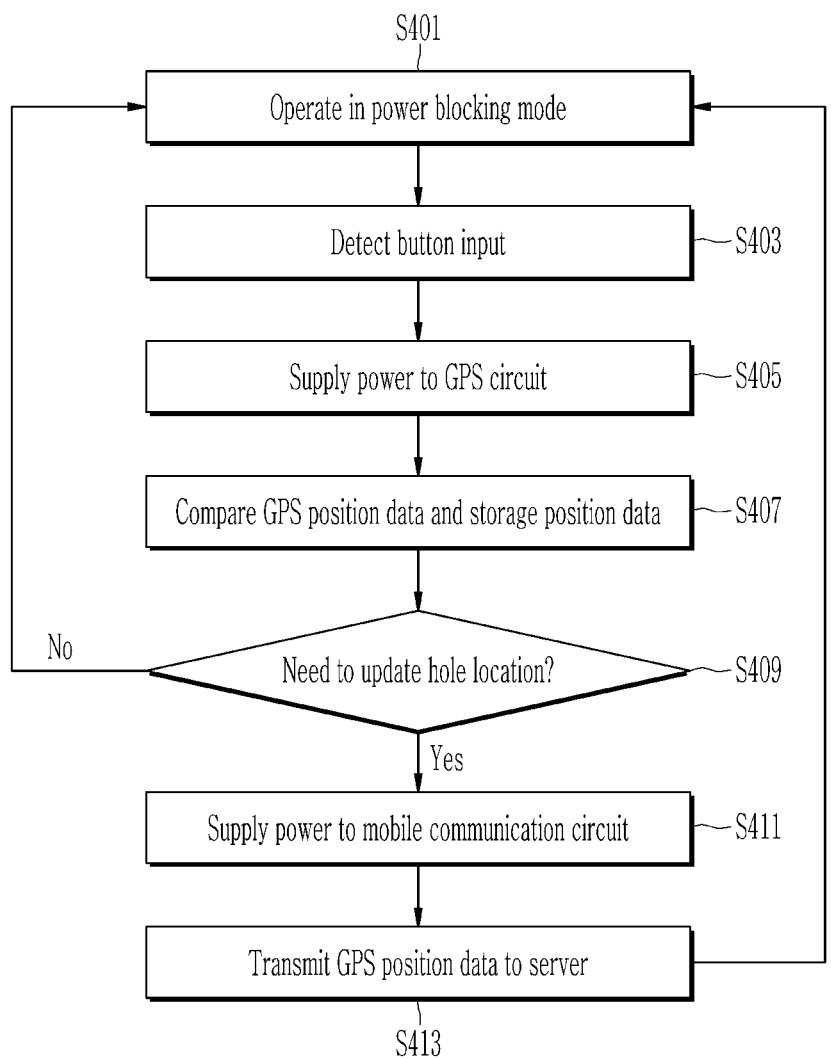
FIG. 4 shows a flowchart of a method for operating a hole location updating device according to an embodiment of the present disclosure.

FIG. 4 shows a flowchart of a method for operating a hole location updating device according to an embodiment of the present disclosure.

Referring to FIG. 4, the method for operating a hole location updating device 10 may include allowing the control circuit 100 to be operated in the power blocking mode (S401). The control circuit 100 may block the supplying of power to all constituent elements excluding the wakeup signal detecting circuit for detecting a button input by controlling the power supply circuit 150.

The method may include allowing the control circuit 100 to detect a button input by using a wakeup signal (S403). Here, the wakeup signal may be a signal generated from the button input generated by at least one button 110, that is, a signal generated from the button input pressed by the manager to notify that the position of the hole is changed. Detection of the wakeup signal may be realized by, for example, a known interrupt detecting method, and the range of the present disclosure is not limited thereto.

The method may also include the control circuit 100 supplying power to the GPS circuit 140 in response to the wakeup signal (S405). In detail, the control circuit 100 may enter the wakeup mode in response to the wakeup signal to start an operation, and may supply power to the GPS circuit 140. The control circuit 100 may receive GPS position data on the hole from the GPS circuit 140.

The method may include comparing the storage position data stored by the hole location updating device 10 and the GPS position data (S407). The storage position data may be positioned in, for example, a register, a memory, or a storage device installed in the hole location updating device 10.

When the hole location is determined to need an update (Yes in S409) as a result of comparison, that is, as a result of determining whether it is needed to update the hole location (S409), the method may include the control circuit 100 supplying power to the mobile communication circuit 120 (S411), and determining whether the hole location updating device 10 is successfully accessed to the mobile communication network, and transmitting the GPS position data, that is, the latest position data, to the server 20 (S413). The control circuit 100 transmits the GPS position data to the server 20 and enters the power blocking mode, and the method may proceed to the stage of S401.

Here, the case of determination that the hole location is needed to be updated may signify a case in which a distance difference between the storage position data and the GPS position data is equal to or greater than a predetermined distance. For example, it may be determined as that there is a need to update the hole location only when the distance difference between the storage position data and the GPS position data is equal to or greater than several meters such as equal to or greater than 1 m or equal to or greater than 2 m. The above-noted standard is an example, and policies and algorithms for determining whether a hole location update is needed may be determined depending on detailed realization objects.

When it is determined as that the hole location is not needed to be updated as a result of comparison, that is, as a result of determination (No in S409) whether the hole location is needed to be updated (S409), the control circuit 100 may enter the power blocking mode and the method may proceed to the stage of S401.

Here, the case of determination as that the hole location is not needed to be updated may signify a case in which a distance difference between the storage position data and the GPS position data is less than a predetermined distance. For example, it may be determined as that there is no need to update the hole location when the distance difference between the storage position data and the GPS position data is less than 1 m. The above-noted standard is an example, and policies and algorithms for determining whether a hole location update is not needed may be determined depending on detailed realization objects.

According to the present embodiment, the hole location updating device 10 stays in the power blocking mode as a default, it enters the wakeup mode and updates the hole location only when the manager notifies the change of the hole position by using a button, and it enters the power blocking mode after completing the hole location update, thereby substantially reducing the power consumption. In addition, the hole location updating device 10 may be realized as a combination type with the flagpole 5, and may provide the hole location to the golfer with very high precision.

Figure 5:
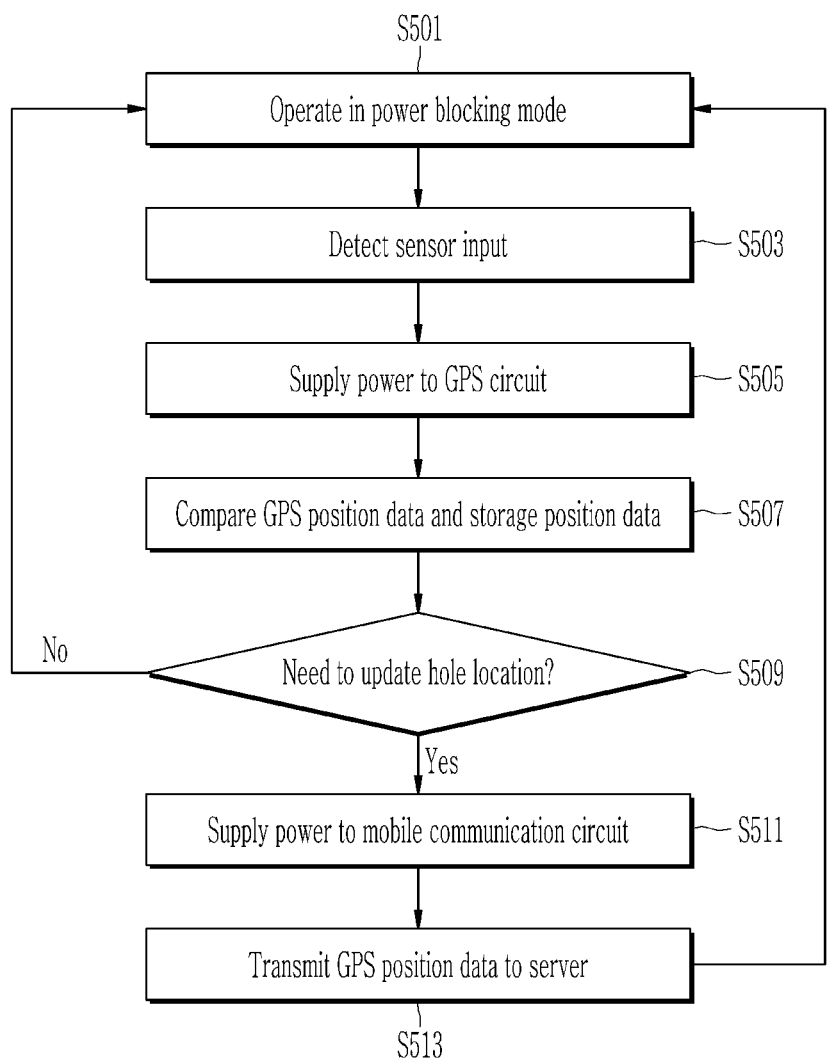
FIG. 5 shows a flowchart of a method for operating a hole location updating device according to an embodiment of the present disclosure.

FIG. 5 shows a flowchart of a method for operating a hole location updating device according to an embodiment of the present disclosure.

Referring to FIG. 5, the method for operating a hole location updating device 10 according to an embodiment of the present disclosure may include the control circuit 100 being operable in the power blocking mode (S501). The control circuit 100 may block the supplying of power to all constituent elements excluding the wakeup signal detecting circuit for detecting a sensor input and the sensor 130 by controlling the power supply circuit 150.

The method may include the control circuit 100 detecting the sensor input by using the wakeup signal (S503). The wakeup signal may be a signal generated from the sensor input generated by the sensor 130.

When the sensor 130 includes an acceleration sensor, the sensor input may indicate an angle by which the flagpole 5 stands. The sensor input may indicate the distance the flagpole 5 moves, that is, the distance the hole location updating device 10 moves.

When the sensor 130 includes a touch sensor, the sensor input may be an input generated when the tap operation on the hole location updating device 10 is detected.

For example, when the flagpole 5 stands in a vertical way and the manager simultaneously performs a predetermined operation such as changing the hole location and performing the tap operation twice, the control circuit 100 may be realized to recognize the sensor input generated by the acceleration sensor and the touch sensor as the wakeup signal, and by this, a sensor noise input of the acceleration sensor caused when not the manager but the golfer arbitrarily picks the flagpole 5 out of the hole cup and stick it in the green may be distinguished from the wakeup signal.

For another example, the control circuit 100 may be realized to recognize the sensor input generated when the moving distance of the flagpole 5 is ten to twenty steps as the wakeup signal. In another way, the control circuit 100 may be realized to recognize the sensor input generated when the moving distance of the flagpole 5 corresponds to ten to twenty steps and the flagpole 5 then stands in a vertical way as the wakeup signal.

The above-noted detection of the wakeup signal may be realized by, for example, a known interrupt detecting method, and the range of the present disclosure is not limited thereto.

The method may also include the control circuit 100 supplying power to the GPS circuit 140 in response to the wakeup signal (S505). In detail, the control circuit 100 may enter the wakeup mode in response to the wakeup signal to start an operation, and may supply power to the GPS circuit 140. The control circuit 100 may receive GPS position data on the hole from the GPS circuit 140.

The method may include comparing the storage position data stored by the hole location updating device 10 and the GPS position data (S507). The storage position data may be positioned in, for example, a register, a memory, or a storage device installed in the hole location updating device 10.

When the hole location is determined to need an update (Yes in S509) as a result of comparison, that is, as a result of determining whether it is needed to update the hole location (S509), the method may include the control circuit 100 supplying power to the mobile communication circuit 120 (S511), and determining whether the hole location updating device 10 is successfully accessed to the mobile communication network, and transmitting the GPS position data, that is, the latest position data, to the server 20 (S513). The control circuit 100 transmits the GPS position data to the server 20 and enters the power blocking mode, and the method may proceed to the stage of S501.

Here, the case of determination that the hole location is needed to be updated may signify a case in which a distance difference between the storage position data and the GPS position data is equal to or greater than a predetermined distance. For example, it may be determined as that there is a need to update the hole location only when the distance difference between the storage position data and the GPS position data is equal to or greater than several meters such as equal to or greater than 1 m or equal to or greater than 2 m. The above-noted standard is an example, and policies and algorithms for determining whether a hole location update is needed may be modified in many ways depending on detailed realization objects.

When it is determined that the hole location is not needed to be updated as a result of comparison, that is, as a result of determination (No in S509) whether the hole location is needed to be updated (S509), the control circuit 100 may enter the power blocking mode and the method may proceed to the stage of S501.

Here, the case of determination that the hole location is not needed to be updated may signify a case in which a distance difference between the storage position data and the GPS position data is less than a predetermined distance. For example, it may be determined as that there is no need to update the hole location when the distance difference between the storage position data and the GPS position data is less than 1 m. The above-noted standard is an example, and policies and algorithms for determining whether a hole location update is not needed may be determined depending on detailed realization objects.

According to the present embodiment, the hole location updating device 10 stays in the power blocking mode as a default, and enters the wakeup mode to update the hole location only when the flagpole 5 stands in a vertical way, and the manager simultaneously performs predetermined operations such as changing the hole location and performing the tap operation twice, and it enters the power blocking mode after completing the hole location update, thereby substantially reducing the power consumption. In addition, the hole location updating device 10 may be realized as a combination type with the flagpole 5, and may provide the hole location to the golfer with very high precision.

Figure 6:
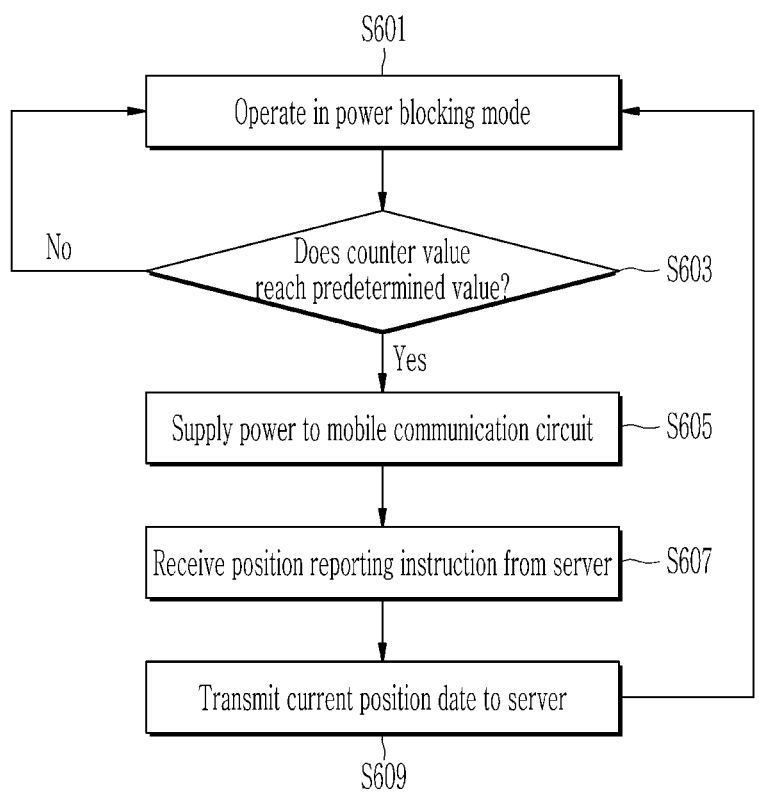
FIG. 6 shows a flowchart of a method for operating a hole location updating device according to an embodiment of the present disclosure.

FIG. 6 shows a flowchart of a method for operating a hole location updating device according to an embodiment of the present disclosure.

Referring to FIG. 6, the method for operating a hole location updating device according to an embodiment of the present disclosure may include the control circuit 100 being operated in the power blocking mode (S601). The control circuit 100 may further include a counter. The wakeup signal may be generated when a value of the counter reaches a predetermined value.

The control circuit 100 may block the supplying of power to all constituent elements excluding the wakeup signal detecting circuit for detecting a sensor input and the counter by controlling the power supply circuit 150.

The method may include determining whether the counter value has reached a predetermined value (S603). When the counter value has not reached a predetermined value according to a result of determination (No in S603), the control circuit 100 may enter the power blocking mode, and the method may proceed to the stage of S601.

The method may include, when the counter value reaches a predetermined value (Yes in S603) as a result of determination, the control circuit 100 supplying power to the mobile communication circuit 120 in response to the wakeup signal (S605). The control circuit 100 may transmit the storage position data to the server 20. An operation for the hole location updating device 10 to periodically transmit the storage position data to the server 20 will be referred to as a "periodical reporting operation."

The method may include the control circuit 100 receiving a position reporting instruction from the server 20 by using the mobile communication circuit 120 (S607).

When an omission happens like a case when the manager changes the hole location and does not press the button 110 or a case when the flagpole 5 is put in a vertical way and the manager does not perform the tap operation a predetermined number of times, the server 20 may detect that the omission is generated. For example, when the hole locations of seventeen holes from among eighteen holes are moved and the hole location of one hole is not moved in the same golf course, the server 20 may doubt an omission and may transmit a position reporting instruction to the hole location updating device 10.

Regarding the hole location updating device 10, the mobile communication circuit 120 may be operated in the case of a periodical reporting operation, excluding the case in which the manager performs a normal action. That is, the server 20 may transmit the position reporting instruction to the hole location updating device 10 when the hole location updating device 10 performs a periodical reporting operation.

Further, the method may include the control circuit 100 supplying power to the GPS circuit 140 in response to the position reporting instruction received from the server 20, receiving GPS position data on the hole from the GPS circuit 140, and transmitting the GPS position data, that is, current position data, to the server by using the mobile communication circuit 120 (S609). The control circuit 100 may transmit the GPS position data to the server 20 and enter the power blocking mode, and the method may proceed to the stage of S601.

According to the present embodiment, when the omission is generated like the case in which the manager changes the hole location and does not press the button 110 or the case in which the flagpole 5 is put in a vertical way and the manager does not perform the tap operation a predetermined number of times, the server 20 may instruct the hole location updating device 10 to update the position, while consuming no additional power, by using the periodical reporting operation that is periodically performed by the hole location updating device 10 at predetermined time intervals, thereby very efficiently minimizing omission of hole location information.

Figure 7:
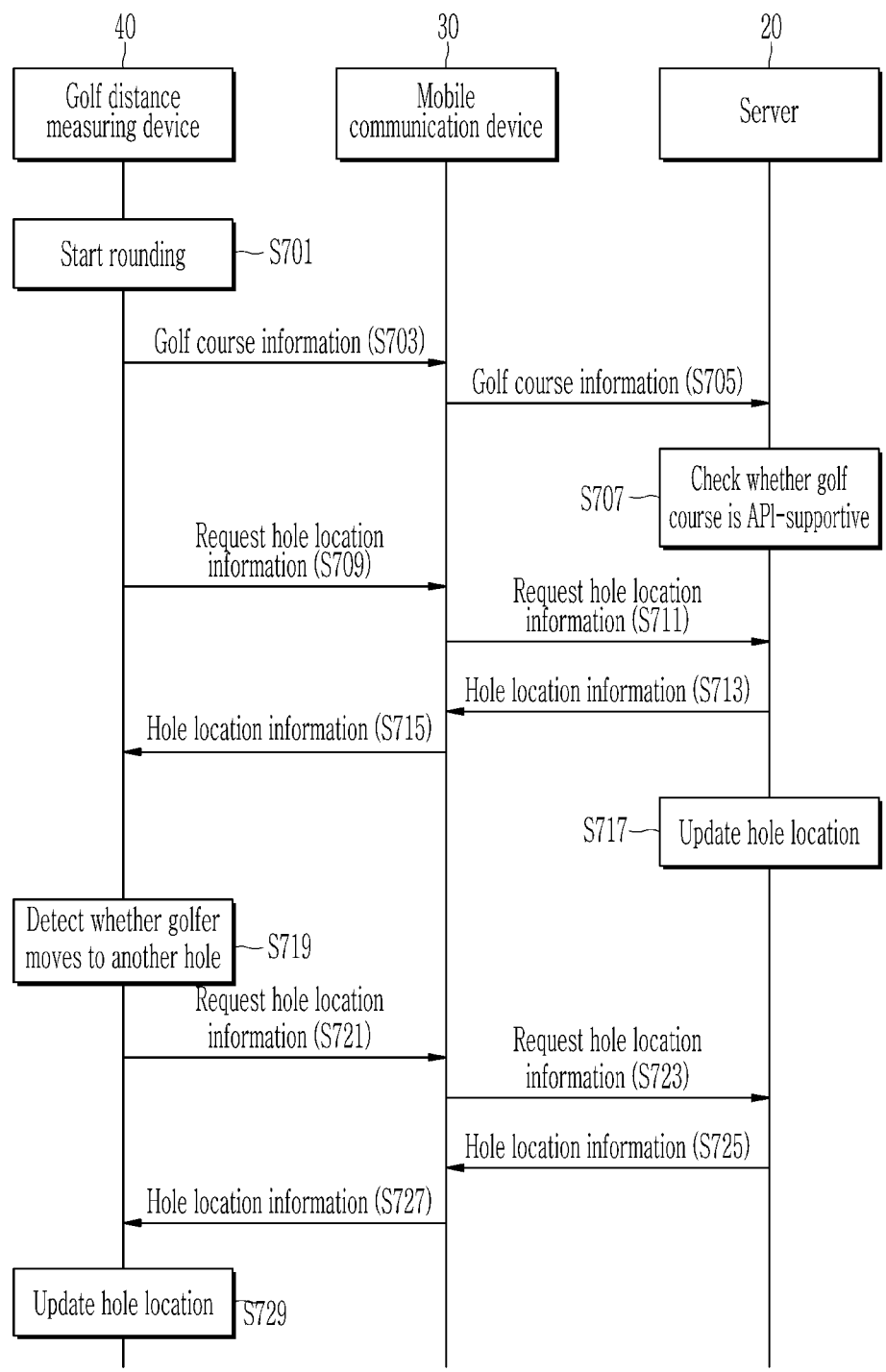
FIG. 7 shows a flowchart of a method for operating a hole location updating system according to an embodiment of the present disclosure.

FIG. 7 shows a flowchart of a method for operating a hole location updating system according to an embodiment of the present disclosure.

The golf distance measuring device 40 of the hole location updating system 1 according to an embodiment of the present disclosure may receive the hole location from the mobile communication device 30, and the access to the mobile communication device 30 may be disconnected (e.g., when it may not be directly connected to the network 50 but may be connected to the network 50 through the mobile communication device 30, that is, when the network 50 is a mobile communication network and the golf distance measuring device 40 include a Bluetooth communication chip.)

For example, the golfer wearing the golf distance measuring device 40 generally plays a round without carrying the mobile communication device 30, so the connection between the golf distance measuring device 40 and the mobile communication device 30 may be frequently cut.

Referring to FIG. 7, based on a fact that the golf distance measuring device 40 and the mobile communication device 30 may be connected with a high probability when moving among the holes, the hole location updating system 1 may perform a hole location update operation of the golf distance measuring device 40 while playing a round.

In (S701), the golf distance measuring device 40 may detect starting of the round. For example, the golfer may provide information that the round has started to the golf distance measuring device 40.

In (S703 and S705), the golf distance measuring device 40 may transmit golf course information on the golf course where the golf distance measuring device 40 is positioned to the mobile communication device 30, and the mobile communication device 30 may transmit corresponding golf course information to the server 20.

In S707, the server 20 may determine whether the corresponding golf course is a golf course supporting automatic pin location (APL), that is, an automatic hole location providing service. When the golf course is an APL-supported golf course, hole location information with respect to a current state may be provided to the golf distance measuring device 40 through the mobile communication device 30 (S713 and S715) in response to a hole location information request (S709 and S711). The golf distance measuring device 40 may provide the distance to the hole from the current position to the golfer based on the corresponding hole location information.

In (S717), the server 20 may receive updated hole location data from the hole location updating devices 10 and may update the hole location. The golfer may still be playing the round.

In (S719), to update the hole location while playing the round, the golf distance measuring device 40 may detect whether the golfer moves among the holes. For example, assuming that the golfers walk leaving the mobile communication device 30 in a cart, the probability of connecting the golf distance measuring device 40 and the mobile communication device 30 substantially increases when the golfer gets in the cart.

Therefore, when detecting whether the golfer moves among the holes, the golf distance measuring device 40 may check the access to the mobile communication device 30, the golf distance measuring device 40 may request hole location information from the mobile communication device 30 (S721 and S723), the mobile communication device 30 may request hole location information from the server 20, and the golf distance measuring device 40 may receive the updated hole location information from the server 20 through the mobile communication device 30 (S725 and S727).

In (S729), the golf distance measuring device 40 may update the hole location according to the received hole location information, and may provide the distance to the hole from the current position to the golfer based on the updated hole location information.

According to the present embodiment, as the golf distance measuring device 40 actively determines whether the hole location is changed, the golfer may obtain the automatically updated hole location information without special manipulation, thereby substantially increasing usability.

Figure 8:
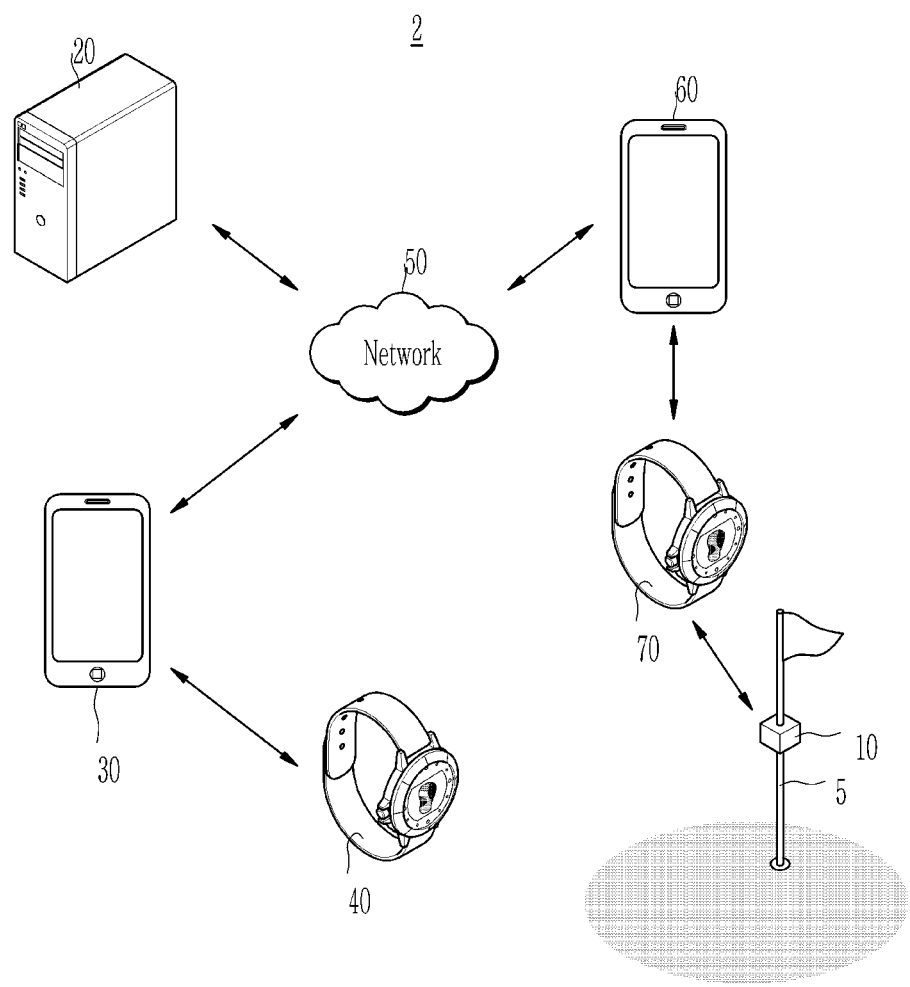
FIG. 8 shows a schematic diagram of a hole location updating system according to another embodiment of the present disclosure.

FIG. 8 shows a schematic diagram of a hole location updating system according to another embodiment of the present disclosure.

Referring to FIG. 8, the hole location updating system 2 according to another embodiment of the present disclosure may include a hole location updating device 10, a server 20, mobile communication devices 30 and 60, and golf distance measuring devices 40 and 70. However, the range of the present disclosure is not limited thereto, and the hole location updating system 2 may further include additional constituent elements or may omit some constituent elements, compared to what is shown in FIG. 8.

The hole location updating device 10 attached to the flagpole 5 put in the hole cup measures the current hole location and transmits the measured hole location to the golf distance measuring device 70. When the golf distance measuring device 70 provides the hole location received from the hole location updating device 10 to the mobile communication device 60, the mobile communication device 60 transmits the hole location to the server 20 through the network 50, for example, a mobile communication network. The server 20 transmits the latest hole location to the mobile communication device 30 through the network 50, and the mobile communication device 30 may provide the latest hole location to the golf distance measuring device 40 through, for example, an application performed on a smartphone.

Figure 9:
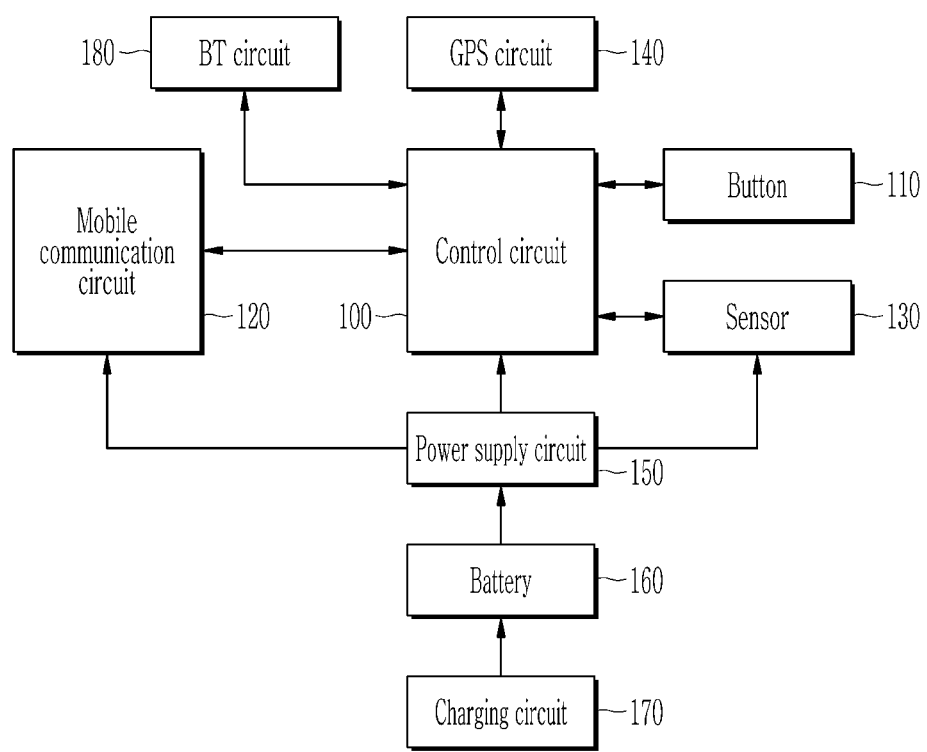
FIG. 9 shows a block diagram of a hole location updating device according to another embodiment of the present disclosure.

FIG. 9 shows a block diagram of a hole location updating device according to another embodiment of the present disclosure.

Referring to FIG. 9, the hole location updating device 10 according to another embodiment of the present disclosure may include a control circuit 100, a button 110, a mobile communication circuit 120, a sensor 130, a GPS circuit 140, a power supply circuit 150, a battery 160, and a Bluetooth (BT) circuit 180. Depending on whether the battery 160 is chargeable, the hole location updating device 10 according to the present embodiment may further include a charging circuit 170. Descriptions on the control circuit 100, the button 110, the mobile communication circuit 120, the sensor 130, the GPS circuit 140, the power supply circuit 150, the battery 160, and the charging circuit 170 may refer to what are described with reference to FIG. 3, which will not be repeatedly described.

The BT circuit 180 may provide a Bluetooth communication interface for transmitting the hole location measured by the hole location updating device 10 to the golf distance measuring device 70. That is, the BT circuit 180 may provide a communication environment for transmitting the hole location data transmitted to the network 50 by the hole location updating device 10 to the network 50 through the golf distance measuring device 70 and the mobile communication device 60 from among the descriptions provided with reference to FIG. 1 to FIG. 7.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A hole location updating device having a housing including a flagpole combiner for providing a combination with a flagpole, comprising:
   a global positioning system (GPS) circuit for detecting a GPS position of a hole;
   a mobile communication circuit for providing access to a server through a mobile communication network;
   a control circuit operable in a power blocking mode, escaping from the power blocking mode in response to a wakeup signal to update a hole location, and entering the power blocking mode; and
   an acceleration sensor measuring a distance the flagpole moves and an angle by which the flagpole stands,
   wherein the control circuit recognizes a signal generated from a button or a touch sensor provided in the housing as the wakeup signal, only when the angle measured by the acceleration sensor at which the flagpole stands in a vertical way, or the moving distance measured by the acceleration sensor is more than a predetermined distance.

2. The hole location updating device of claim 1, wherein the control circuit supplies power to the GPS circuit and the mobile communication circuit in response to the wakeup signal, receives GPS position data on the hole from the GPS circuit, and transmits the GPS position data to the server by using the mobile communication circuit.

3. The hole location updating device of claim 2, wherein the control circuit transmits the GPS position data to the server and enters the power blocking mode.

4. The hole location updating device of claim 1, wherein the control circuit supplies power to the GPS circuit in response to the wakeup signal, receives GPS position data on the hole from the GPS circuit, and compares storage position data stored by the hole location updating device and the GPS position data, and
when a hole location update is determined to be needed as a result of the comparison,
the control circuit supplies power to the mobile communication circuit and transmits the GPS position data to the server by using the mobile communication circuit.

5. The hole location updating device of claim 4, wherein the control circuit transmits the GPS position data to the server and enters the power blocking mode.

6. The hole location updating device of claim 4, wherein when the hole location update is determined to be unneeded as a result of the comparison,
the control circuit enters the power blocking mode.

7. The hole location updating device of claim 1, wherein the housing further includes at least one button, and
the wakeup signal is generated from a button input generated by the at least one button.

8. The hole location updating device of claim 1, wherein the hole location updating device further includes a sensor, and
the wakeup signal is generated from a sensor input generated by the sensor.

9. The hole location updating device of claim 8, wherein the sensor includes an acceleration sensor, and
the sensor input indicates an angle at which the flagpole stands.

10. The hole location updating device of claim 8, wherein the sensor includes an acceleration sensor, and
the sensor input represents a distance the hole location updating device moves.

11. The hole location updating device of claim 8, wherein the sensor includes a touch sensor, and
the sensor input is generated when a tap operation on the hole location updating device is detected.

12. The hole location updating device of claim 1, wherein the control circuit further includes a counter, and
the wakeup signal is generated when a value of the counter reaches a predetermined value.

13. The hole location updating device of claim 12, wherein
the control circuit supplies power to the mobile communication circuit in response to the wakeup signal, and
when receiving a position reporting instruction from the server by using the mobile communication circuit,
the control circuit receives GPS position data on a hole from the GPS circuit, and transmits the GPS position data to the server by using the mobile communication circuit.

14. A method for operating a hole location updating device having a housing including a flagpole combiner for providing a combination with a flagpole and an acceleration sensor measuring a distance the flagpole moves and an angle by which the flagpole stands, comprising:
operating in a power blocking mode;
receiving a wakeup signal by recognizing a signal generated from a button or a touch sensor provided in the housing as the wakeup signal, only when the angle measured by the acceleration sensor at which the flagpole stands in a vertical way, or the moving distance measured by the acceleration sensor is more than a predetermined distance;
escaping from the power blocking mode in response to the wakeup signal and updating the hole location; and
entering the power blocking mode.

15. The method of claim 14, wherein
the updating of the hole location includes:
supplying power to a GPS circuit and receiving GPS position data on the hole from the GPS circuit; and
supplying power to a mobile communication circuit and transmitting the GPS position data to a server by using the mobile communication circuit.

16. The method of claim 14, wherein
the updating of the hole location includes:
supplying power to a GPS circuit and receiving GPS position data on the hole from the GPS circuit;
comparing storage position data stored by the hole location updating device and the GPS position data; and
when a hole location update is determined to be needed as a result of the comparison, supplying power to a mobile communication circuit, and transmitting the GPS position data to the server by using the mobile communication circuit.

17. The method of claim 16, wherein
the updating of the hole location further includes,
when a hole location update is determined to be unneeded as a result of the comparison, entering the power blocking mode.

18. The method of claim 14, wherein
the housing further includes at least one button, and
the wakeup signal is generated from a button input generated by the at least one button.

19. The method of claim 14, wherein
the hole location updating device further includes a sensor, and
the wakeup signal is generated from a sensor input generated by the sensor.

20. The method of claim 14, wherein
the hole location updating device further includes a counter,
the wakeup signal is generated when a value of the counter reaches a predetermined value, and
the method for operating a hole location updating device includes
supplying power to a mobile communication circuit in response to the wakeup signal,
receiving a position reporting instruction from a server by using the mobile communication circuit,
receiving GPS position data on a hole from a GPS circuit, and
transmitting the GPS position data to the server by using the mobile communication circuit.

* * * * *